(No Model.)
R. D. HARDY.
NUT LOCK.
No. 589,599. Patented Sept. 7, 1897.
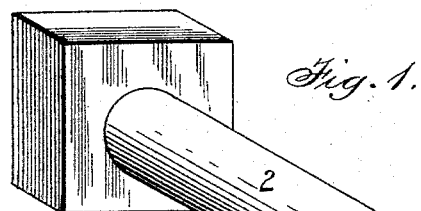
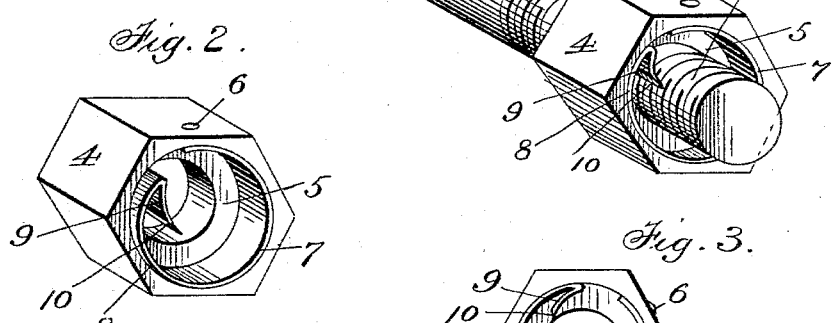
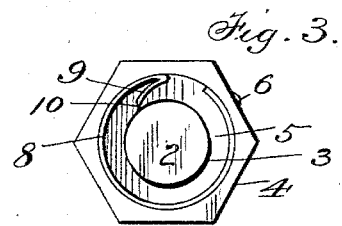
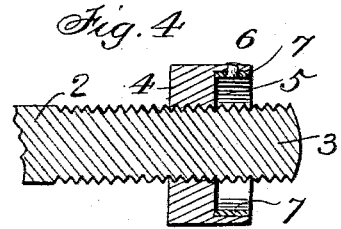
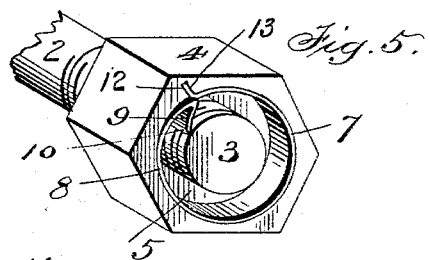
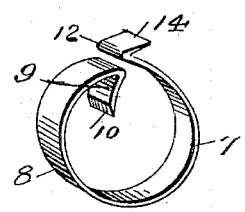
Witnesses.
F. L. Ourand.
A. J. Smit.
Inventor
Rodney D. Hardy.
By H. Brunton
Attorney.

UNITED STATES PATENT OFFICE.

RODNEY D. HARDY, OF LORAIN, OHIO.

NUT-LOCK.

SPECIFICATION forming part of Letters Patent No. 589,599, dated September 7, 1897.

Application filed April 7, 1896. Serial No. 586,563. (No model.)

*To all whom it may concern:*

Be it known that I, RODNEY D. HARDY, a citizen of the United States, residing at Lorain, in the county of Lorain and State of Ohio, have invented certain new and useful Improvements in Nut-Locks for Railroad-Rails; and I do declare the following to be a full, clear, and exact description of the invention, such as will enable others skilled in the art to which it appertains to make and use the same.

My invention has relation to nut-locks for railroad-rails; and the object is to provide a simple, cheap, and reliable device of this class that will absolutely and effectually retain the nut in its proper position on the bolt when it has been screwed home on the rail and at the same time readily be removed by the use of a proper implement when it becomes necessary to do so for the purpose of repairing the track; and to these ends the novelty consists in the construction, combination, and arrangement of the same, as will be hereinafter more fully described, and particularly pointed out in the claims.

In the accompanying drawings the same reference-numerals indicate like parts of the invention.

Figure 1 is a perspective view of a bolt with my improved nut-lock in place. Fig. 2 is a perspective view of the nut detached from the end of the bolt. Fig. 3 is an end view of the nut in place on the bolt. Fig. 4 is a longitudinal section taken on the line of the rivet 6. Fig. 5 is a modification of the form of the spring, and Fig. 6 is another modification of the form of the spring.

2 is an ordinary machine-threaded bolt, the threaded end 3 of which is provided with an ordinary hexagonal nut 4, having a concentric circular recessed chamber 5, in the periphery of which is secured by a rivet 6 one end of a flat circular spring 7, the free end 8 of which is bent back inwardly and forms a tooth 9. The point 10 is chisel-shaped to slide freely over the threads when the nut is being screwed on or home and to impinge or bite into said threads and rigidly lock the nut on the bolt, thereby preventing its accidental loosening or displacement; but should it become necessary to loosen and remove the nut for repairs to the track the point of a sharp instrument can be pried under the tooth to release its point from the thread, and in this condition the nut can be removed.

Instead of riveting the end of the spring to the wall of the chamber 5 that end of said spring can be formed with a tooth 12, bent in the opposite direction to the tooth 9, so that its point will engage with a radial slot 13 in the wall of the chamber under the tooth 9, and as the pressure is applied to the tooth 9 it will force the point of the other tooth into the side of the wall of the chamber and prevent the nut from turning backward, as shown in Fig. 5.

In Fig. 6 I have shown the tooth 12 with a chisel-point 14, which will engage with the wall of the chamber at any point and lock the spring in place.

Having thus described my invention, what I claim, and desire to secure by Letters Patent of the United States, is—

1. A nut-lock comprising a bolt having at one end a continuous uninterrupted thread, a nut formed with a circular recess, a circular spring located in said recess and having a reversely-formed chisel-pointed tooth, adapted to freely pass over the threads of the bolt when the nut is being screwed home and to bite into the apexes of the thread and lock the nut when turned in the opposite direction.

2. A nut-lock comprising a bolt having at one end a continuous uninterrupted thread, a nut formed with a circular recess, a circular spring located in said recess and having a reversely-formed chisel-tooth at one end, and at the other end a chisel-pointed tooth projecting beyond and in a reverse direction to the first-named tooth, the said teeth being adapted to engage respectively the threads of the bolt and the interior wall of the recess and slide upon the same when the nut is turned in one direction and to bite into the threads and into the interior wall of the recess and lock the nut when it is turned in the opposite direction, substantially as shown and described.

In testimony whereof I hereunto affix my signature in presence of two witnesses.

RODNEY D. HARDY.

Witnesses:
JOHN JOHNSON,
JAMES LEE.